United States Patent [19]
Mittelhäuser et al.

[11] Patent Number: 5,086,357
[45] Date of Patent: Feb. 4, 1992

[54] EXTERNAL MIRROR FOR A MOTOR VEHICLE

[75] Inventors: Bernhard Mittelhäuser, Am Krähenberg, 3002 Wedemark 2, Fed. Rep. of Germany; Jan Schubert, Wedemark, Fed. Rep. of Germany

[73] Assignee: Bernhard Mittelhäuser, Wedemark, Fed. Rep. of Germany

[21] Appl. No.: 592,610

[22] Filed: Oct. 4, 1990

[30] Foreign Application Priority Data

Oct. 7, 1989 [DE] Fed. Rep. of Germany ....... 3933641

[51] Int. Cl.⁵ .............................................. G02B 7/18
[52] U.S. Cl. ..................................... 359/841; 359/873
[58] Field of Search ................ 350/604, 605, 633, 637

[56] References Cited

U.S. PATENT DOCUMENTS 2,871,761  2/1959  Snyder ................................. 350/605
3,469,901  9/1969  Cook ................................... 350/605

FOREIGN PATENT DOCUMENTS 55-87632  7/1980  Japan ................................. 350/605

*Primary Examiner*—Bruce Y. Arnold
*Assistant Examiner*—J. P. Ryan
*Attorney, Agent, or Firm*—Robert W. Becker & Associates

[57] ABSTRACT

An external mirror for a motor vehicle is provided. The mirror includes parts that are pivotable to a limited extent between two end positions. An electric motor serves to pivot these parts, with a slip coupling being interposed between the electric motor and the pivotable parts. To be able to automatically establish a synchronization between the pivotable parts and the electric motor, supply of power to the motor is effected via contact strips having an effective length that is greater than the pivot path of the pivotable parts such that even in the end positions of these parts, power can still be supplied to the electric motor. A loop that is associated with the contact strips is connected to the electric motor in such a way as to move therewith.

4 Claims, 1 Drawing Sheet

EXTERNAL MIRROR FOR A MOTOR VEHICLE

BACKGROUND OF THE INVENTION

The present invention relates to an external rear view or side view mirror for a motor vehicle, and includes: parts (a mirror panel and a housing in which the mirror panel is disposed) that are pivotable to a limited extent between two end positions; an electric motor that serves to pivot the pivotable parts and that can be selectively rotated in either of two opposite directions; and a slip coupling that is interposed between the electric motor and the pivotable parts. In particular, the present invention relates to such a mirror where the housing, together with the mirror panel that is adjustably disposed therein, can be pivoted about an approximately vertical axis in the direction of and counter to the longitudinal direction of the vehicle, i.e. with respect to this longitudinal direction toward the front and toward the rear from a transverse position into the so-called park position and vice versa.

With the heretofore known mirrors of this general type the electric motor is shut off in the end positions of the aforementioned pivotable parts via limit switches. However, where large tolerances and wear is present, such a construction can lead to errors. In addition, an orderly assembly of the individual components of the heretofore known mirror presupposes kinematically precisely coordinated relationships, for example between the meshing gear wheels.

It is therefore an object of the present invention to avoid these drawbacks by improving a mirror of the aforementioned general type in such a way that the assembly of the mirror is simplified and tolerances as well as wear that occurs do not result in any drawbacks during pivoting of the aforementioned parts and hence electric power can always be supplied in order to enable the end positions of the pivotable parts to be obtained. Furthermore, it should also be possible to be able to correct for unintentional shifting of the pivotable parts.

BRIEF DESCRIPTION OF THE DRAWING

These and other objects and advantages of the present invention will appear more clearly from the following specification in conjunction with the accompanying schematic drawing, which illustrates one exemplary embodiment of the inventive mirror.

SUMMARY OF THE INVENTION

Figure 1:
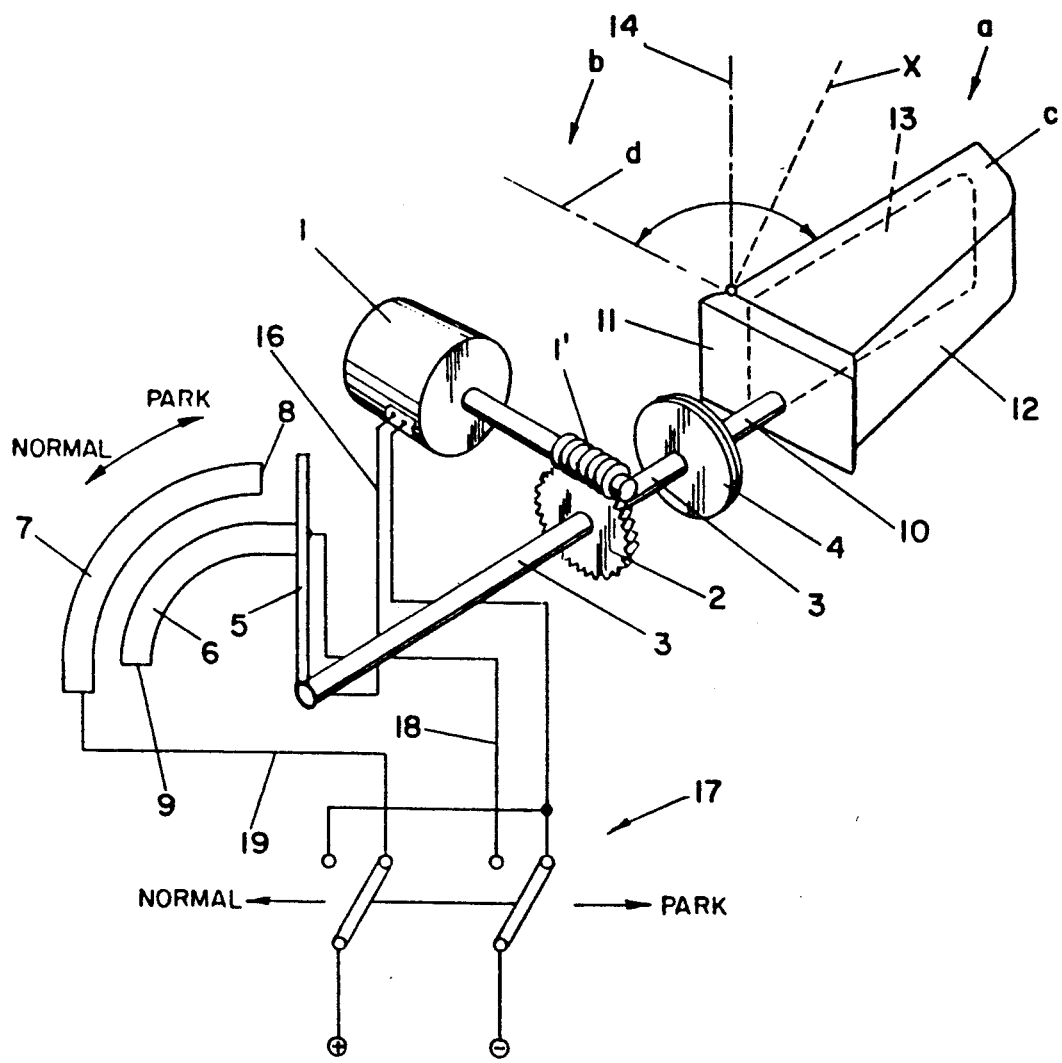

The mirror of the present invention is characterized primarily by conducting means, for supplying power to the electric motor, that includes contact strip means having an effective length that is greater than the pivot path of the pivotable parts between the end positions such that even in these end positions power can be supplied to the electric motor. The conducting means has a movable element, in the form of a brush or loop, that is connected to the electric motor so as to move therewith.

Whereas on the one hand for the operation of the pivotable parts a slip coupling is provided that permits, for example, a pivoting of the housing when an impact or the like is encountered, the conducting means that includes the contact strip means is directly connected to the shaft of the electric motor in a manner free of slip and play. In addition, the conducting means is embodied in such a way that it can also supply power to the electric motor even when the mechanical stop means for the pivotable parts are operational. In this connection, the gear wheels for the reduction gear mechanism can be assembled in any desired manner during assembly of the mirror. If the electric drive is switched on when the gear wheels are not synchronously assembled, the electric drive operates until not only the mechanical stop means but also the ends of the conducting means are reached.

Thus, a synchronization between the conducting means (current paths and contact strips) that determine the power supply, and the mechanical end stops for the pivotable parts automatically results. This effect occurs even when wear has occurred or dimensional variations are present due to tolerance reasons. In all situations, the end of the conducting means is reached, whereupon shut-down of the electric motor occurs. This independent regulation can be carried out as a consequence of the interposed slip coupling, which simultaneously has the advantage that where self locking gear mechanisms (preferably worm gears) are provided, force-induced pivoting of the pivotable parts cannot lead to damage of the gear mechanism.

Further specific features of the present invention will be described in detail subsequently.

DESCRIPTION OF PREFERRED EMBODIMENTS

Referring now to the drawing in detail, illustrated is an electrical pivot mechanism for pivoting the mirror housing of an external rear view or side view mirror in which is disposed a mirror panel. This housing pivots about an approximately vertical axis in the direction of and counter to the longitudinal direction of the vehicle, where the housing can remain, for example in a park position.

The end of the shaft of the electric motor 1 carries a worm 1' that together with a worm gear 2 forms a self-locking gear mechanism. On one side of the worm gear 2, one of the two aligned shafts 3 thereof is fixedly connected to an electrical brush or loop 5, and on the other side the other shaft 3 is fixedly connected to one half of a slip coupling 4. The loop 5 contacts two curved contact strips 6, 7 that are offset relative to one another in such a way that one end of each contact strip is shorter than the associated end of the adjacent strip. As a result, at these opposed shorter end locations 8 and 9 a conductive connection is prevented between the loop 5 and one of the contact strips 6 or 7.

That half of the slip coupling 4 that is disposed remote from the shaft 3 is fixedly mounted on a shaft 10 that leads to a suitable pivot device that is equipped with lever and guide means; the pivot device is disposed within a base 11 that is secured to the outside of the vehicle. The housing 12 for the mirror panel 13 that is disposed therein is mounted on the base 11 in such a way as to be pivotable about an approximately vertical pivot axis 14 from a transverse position "a" into a park position "b", in other words, by about 90°. Thus, by means of the pivot device it is possible to pivot the housing 12 into the two end positions "c" and "d" in which the housing 12, or elements that are connected therewith, rest against fixed limiting stop means.

The electrical connections of the motor 1, in the form of wires 15, 16, lead to a reversing switch 17 and the base of the loop 5. The ends of the two contact strips 6, 7 communicate with the reversing switch 17 via respective leads 18, 19.

Thus, in one position of the switch power is supplied to the electric motor 1 via the contact strip 6, and in the other position power is supplied via the contact strip 7.

The important thing is that the effective length of the contact strips 6 7 be greater than the pivot path of the housing 12. This means that the loop 5 is in conductive communication with the contact strips 6, 7 even when the housing 12 rests against a stop means (end position c, d). Under these conditions, the electric motor 1 continues to turn (this is possible due to the slip coupling 4) until the loop 5 has reached one of the positions indicated by the reference numerals 8 or 9, whereupon shut-down of the motor 1 is effected.

To better illustrate how the inventive mirror operates, imagine that, for example due to the influence of an external force, the housing 12 has assumed a central position (the position indicated by "x") but the reversing switch 12 has the "park" position illustrated in the drawing; in such a case, the reversing switch 17 must be shifted to the "normal" position. In so doing, power is supplied to the electric motor 1 via the contact strip 6; the housing 17 will then come to rest, but the electric motor 1 will continue to turn until the end of the contact strip 6 is reached and finally also the stop position at 9 is reached. In so doing, the synchronization is again completed.

Although during a manual adjustment the control unit loses the orientation relative to the position of the housing 12 or its pivot mechanism, this orientation is reestablished during the next polarity reversal (actuation of the reversing switch 17), and in particular in that the slip coupling 4 operates longer than normal. The significance of this with respect to assembly of the mirror is that the gear wheels of the mechanism can be assembled in any desired manner. Here also the synchronization is established by an electrical switching in the manner previously described.

The present invention is, of course, in no way restricted to the specific disclosure of the specification and drawing, but also encompasses any modifications within the scope of the appended claims.

What we claim is:

1. An external rear view or side view mirror for a motor vehicle, comprising:
    a housing that is pivotable to a limited extent between two end positions and accommodates a mirror panel;
    an electric motor that serves to pivot said housing about an approximately vertical axis, with said electric motor being selectively rotatably in either of two opposite directions to pivot said housing between a park position that forms one of said end positions and is essentially parallel to a longitudinal direction of said vehicle, and a normal operating position that forms the other of said end positions and is transverse to said longitudinal direction of said vehicle;
    a slip coupling that is interposed between said electric motor and said housing; and
    conducting means for supplying power to said electric motor, with said conducting means including contact strip means having an effective length that is greater than a pivot path of said housing between said end positions such that even in said end positions power can be supplied to said electric motor.

2. A mirror according to claim 1, in which said contact strip means comprises two contact strips, one for each of said directions of rotation of said electric motor, with said two contact strips being offset relative to one another; and in which said conducting means further includes a single loop for both of said contact strips, whereby in a first end position of said loop, said loop is in conductive communication with one of said contact strips, and in a second end position of said loop, said loop is in conductive communication with the other of said contact strips.

3. A mirror according to claim 2, in which said loop of said conducting means is a movable element that is connected to said electric motor in such a way as to move therewith.

4. A mirror according to claim 3, which includes a self-locking gear mechanism connected to said electric motor to effect pivoting of said housing, with said gear mechanism including a worm gear that is fixedly connected with said movable loop of said conducting means and with a portion of said slip coupling.

* * * * *